June 5, 1956     J. A. WALLEY     2,749,495
CONTROL CIRCUIT FOR PUMP MOTOR
Filed Feb. 28, 1955
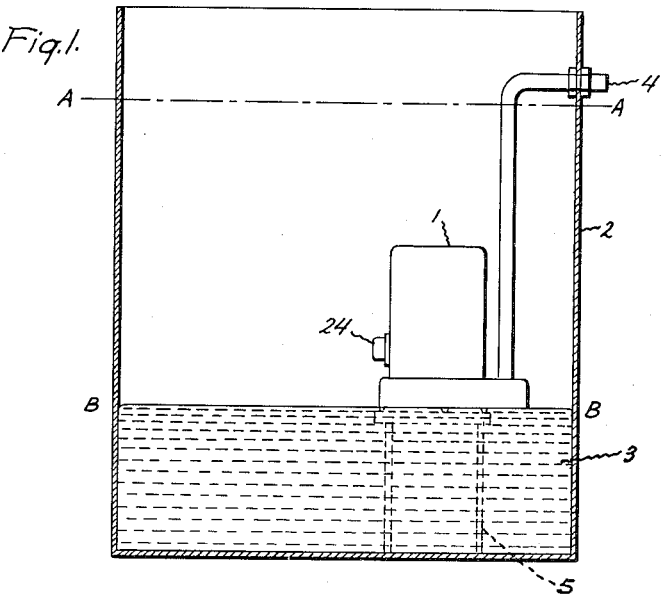
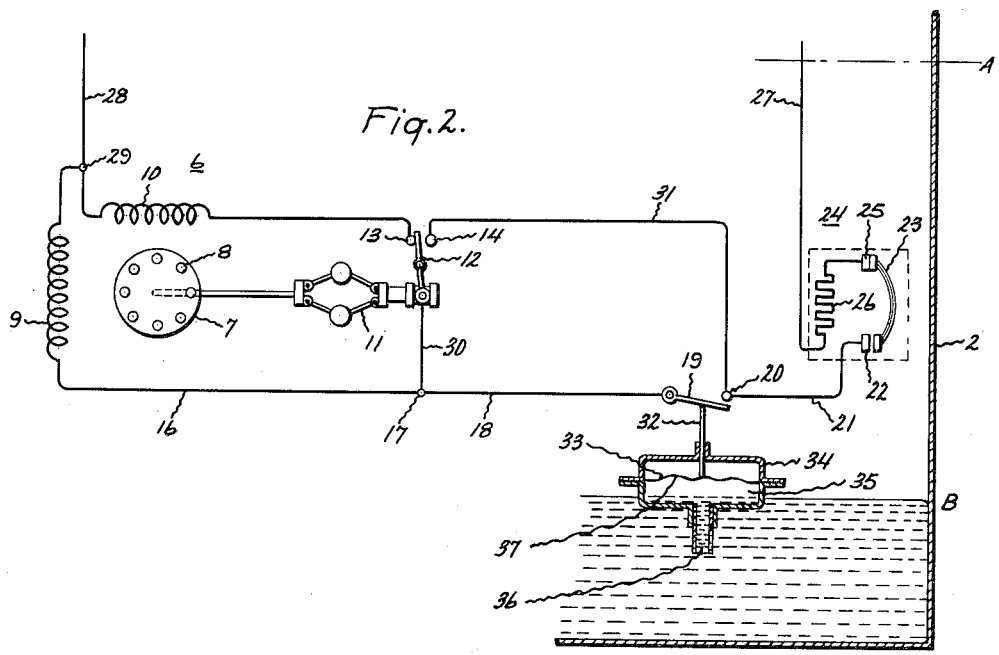
Inventor:
James A. Walley,
by *Robert G. Srul*
His Attorney.

United States Patent Office 2,749,495
Patented June 5, 1956

2,749,495

CONTROL CIRCUIT FOR PUMP MOTOR

James A. Walley, Fort Wayne, Ind., assignor to General Electric Company, a corporation of New York Application February 28, 1955, Serial No. 491,009

9 Claims. (Cl. 318—221)

This invention relates to electric motors and more particularly to a control circuit for submersible pump motors.

When electric motors are used to operate submersible pumps, it is frequently most desirable that the actuation and stopping of the motor occur automatically. For proper automatic operation, the control device should perform two functions: (1) Start the motor at a first predetermined liquid level, and (2) Stop the motor at a second lower predetermined liquid level. To achieve the first function, it is generally necessary to provide a pressure sensitive device which will cause the motor to start when a predetermined pressure is exerted on the device by the liquid to be pumped. Such devices are relatively expensive and consequently increase the cost of the assembly to an appreciable degree, and in the past, to achieve the second function, it has been found necessary either to provide a second pressure responsive device to stop operation of the motor when the second predetermined liquid level is reached or else to add structure to the first device in order to perform this function. In either case, an added expense is inevitable.

As is well known, it is the almost invariable custom nowadays to provide electric motors with thermal protective means which will prevent an over-load current through the windings and, frequently, will also open the circuit in response to an unusually high winding ambient temperature. Since this thermal protector is standard equipment in most motors, and since it performs the function of opening the circuit to the motor, it appears highly desirable to cause the thermal protector to open the circuit in the motor in response to a substantially constant predetermined liquid level. Achievement of this goal will permit elimination of the added cost of a second pressure responsive means to stop the motor without impairing in any way the proper action of the pump.

It is therefore an object of this invention to provide a control circuit for a pump motor wherein the stopping of the pump in response to a predetermined liquid level will be achieved by means of the motor thermal protector.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a pump motor assembly in which a single phase alternating current motor is provided with a running winding and a starting winding connected in parallel. Means are provided to disconnect the starting winding at a predetermined speed, and means responsive to the pressure of the fluid to be pumped are provided and are adapted to close the connections to the windings at a predetermined pressure. Shunt means are arranged in parallel with the pressure responsive means, and the windings are arranged to be connected through the shunt when the predetermined speed is reached so that the motor will continue to operate completely independently of the pressure responsive means. Heat sensitive means are provided in series with the windings and are adapted to be positioned to be cooled by the liquid to be pumped. The heat sensitive means are operative at a predetermined temperature to disconnect the windings of the motor. Once the liquid is pumped below the level of the heat sensitive means, their temperature will rise and will quickly attain the level at which the windings are disconnected. Thus, a predetermined amount of time after the liquid level falls below the heat sensitive means, operation will cease, and since the motor operates the pump at a relatively standard speed, the level at which the motor is opened will be substantially constant and predetermined.

In the drawing, Figure 1 is a side view, partly in cross section, of an improved pump motor assembly arranged within a sump; and Figure 2 is a schematic diagram showing the control circuit for the motor of the assembly of Figure 1.

Referring now to the figures of the drawing, there is shown a pump-motor assembly 1 located within a sump 2 containing a liquid 3. When the liquid attains a predetermined level, such as that indicated by the line A—A, for instance, pump-motor assembly 1 will then pump the liquid out through pipe 4 until the liquid level reaches that shown by the line B—B. Pump-motor assembly 1 may be mounted on supports 5, if so desired, and includes a pump (not visible in the drawing), and a motor, generally indicated by the numeral 6.

Motor 6 may be of the induction type having a squirrel cage rotor 7 with cast conductors 8, a running field winding 9, and a starting field winding 10. Connected to rotor 7 so as to rotate therewith is a centrifugal mechanism 11 which operates a contact 12 arranged to engage either one of a pair of contacts 13 and 14. Contact 13 is connected to starting winding 10 through a line 15. A line 16 extends from running winding 9 and is joined at point 17 to a line 18 which terminates at its other end is a pivotable contact arm 19 engageable with a contact 20 which in turn is connected by a line 21 to another contact 22. A bimetallic element 23 of a thermal protector generally indicated as 24 is arranged to engage contact 22 at one end and to engage another contact 25 at its other end. Contact 25 in turn is connected in series with a heater element 26 which is connected to the source of power (not shown) through line 27. Line 28 completes the connection across the source of power, and is connected at point 29 to both windings 9 and 10. These windings are connected in parallel and, when contact arm 12 is in engagement with contact 13, are joined through line 30 at point 17. A line 31 joins contacts 14 and 20 for a purpose to be hereinafter set forth.

Contact arm 19 is operable by a rod member 32 secured to a diaphragm member 33 within a casing 34. Diaphragm member 33 seals the bottom half of casing 34 from an enclosure 35 which is open at 36 to the liquid to be pumped so that the diaphragm is exposed to the pressure of the liquid and is sensitive to the depth thereof. When the liquid attains a predetermined level, such as the line A—A, the pressure on the under side 37 of diaphragm 33 is sufficient to deform the diaphragm and cause contact arm 19 to close into engagement with contact 20.

The operation of the improved pumping arrangement of this invention will now be set forth. Before the motor is started, the apparatus is in the position shown, with contact arm 19 in open position because the pressure of the liquid is insufficient to deform diaphragm 33, and contact arm 12 in engagement with contact 13 because the motor is not running and therefore the predetermined speed has not been attained. When the liquid reaches level A—A, contact arm 19 will close into engagement with contact 20 and windings 9 and 10 will be energized in parallel to cause motor 6 to start. As the motor comes up to speed, centrifugal mechanism 11 will cause contact arm 12 to move from contact 13 to contact 14. This will disconnect starting winding 10, which is consequently de-energized, and the motor continues to run on winding 9 alone.

At this point, the circuit through winding 9 is completed through two parallel paths starting from point 17. One of these extends through the contact arm 19, while the other extends through the contact arm 12. As the unit 1 continues to pump liquid, the liquid level will descend to a point where the pressure is insufficient to maintain contact arm 19 closed in engagement with contact 20 and the contact arm 19 will then open. Motor 6 will, however, continue to run since the circuit through winding 9 is still completed through contact arm 12 in engagement with contact 14 and shunt line 31. As the pumping continues, the thermal protective device 24 emerges above the liquid level and consequently starts to heat up rapidly since the cooling effect of the liquid has been removed. A relatively short time thereafter, when the liquid has reached the level B—B, for instance, thermal protector 24 will have heated up sufficiently so that the temperature of bimetallic element 23 will cause it to deflect away from contact 22 to open the circuit to winding 9. Motor 6 is consequently stopped and the pumping action ceases.

As the speed decreases below the predetermined level, contact arm 12 returns into engagement with contact 13; however, there is no energization of starting winding 10 because of the disconnection of bimetallic element 23 from contact 22. The apparatus is then in position of readiness to start operation when the liquid again reaches level A—A and contact arm 19 is moved into engagement with contact 20.

It will be seen that this invention provides an arrangement wherein an extremely simple diaphragm arrangement may be provided to start operation of the motor, and wherein no pressure sensitive apparatus whatever is required for stopping of the motor which is effected through the thermal protector 24.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a pump-motor assembly, a single phase alternating current motor having a running winding and a starting winding connected in parallel, switch means arranged to disconnect said starting winding at a predetermined speed, means responsive to the pressure of the liquid to be pumped adapted to close the connections to said windings at a predetermined pressure, a shunt circuit arranged in parallel with said pressure responsive means, said switch means being arranged to connect said running winding through said shunt circuit at said predetermined speed thereby to cause operation of said motor independently of said pressure responsive means, and heat sensitive means in series with said windings and adapted to be positioned to be cooled by the liquid to be pumped, said heat sensitive means being operative to disconnect said windings at a predetermined temperature.

2. In a pump-motor assembly, an electric motor having at least one winding, means responsive to the pressure of the liquid to be pumped adapted to close the connection to said winding at a predetermined pressure, a shunt circuit arranged in parallel with said pressure responsive means, means arranged to connect said winding through said shunt circuit after said motor starts thereby to cause operation of said motor independently of said pressure responsive means, and heat sensitive means in series with said winding and adapted to be positioned to be cooled by the liquid to be pumped until the liquid reaches a predetermined level, said heat sensitive means being operative to disconnect said winding at a predetermined temperature.

3. In a pump-motor assembly, a single phase alternating current motor having a running winding, means for starting said motor, means responsive to the pressure of the liquid to be pumped adapted to close the connection to said winding at a predetermined pressure, a shunt circuit arranged in parallel with said pressure responsive means, means arranged to connect said winding through said shunt circuit after said motor starts thereby to cause operation of said motor independently of said pressure responsive means, and heat sensitive means in series with said winding and adapted to be positioned to be cooled by the liquid to be pumped until the liquid reaches a predetermined level, said heat sensitive means being operative to disconnect said winding at a predetermined temperature.

4. In a pump-motor assembly, a single phase alternating current motor having a running winding and a starting winding connected in parallel, switch means responsive to motor speed to disconnect said starting winding at a predetermined speed, means responsive to the pressure of the liquid to be pumped adapted to close the connections to said windings at a predetermined pressure, a shunt circuit arranged in parallel with said pressure responsive means, said switch means being arranged to connect said running winding through said shunt circuit at said predetermined speed thereby to cause operation of said motor independently of said pressure responsive means, a thermal protector comprising a bimetallic element arranged in heat protective relationship with said windings, and contact means in series with said windings controlled by said bimetallic element, said element being adapted to be positioned to be cooled by the liquid to be pumped until the liquid reaches a predetermined level whereby said element subsequently heats up to operate said contact means in series with said windings.

5. In a pump-motor assembly, a single phase alternating current motor having a running winding and a starting winding connected in parallel, switch means responsive to speed to disconnect said starting winding at a predetermined speed, means responsive to the pressure of the liquid to be pumped adapted to close the connections to said windings at a predetermined pressure, a shunt circuit arranged in parallel with said pressure responsive means, said switch means being arranged to connect said running winding to said shunt circuit at said predetermined speed thereby to cause operation of said motor independently of said pressure responsive means, and a thermal protector comprising a bimetallic element in series with said windings arranged to deflect to open the connection to said windings at a predetermined temperature, said bimetallic element being adapted to be positioned to be cooled by the liquid to be pumped until the liquid reaches a predetermined level whereby said element will subsequently open to disconnect said running winding.

6. In a pump-motor assembly, a single phase alternating current motor having a running winding and a starting winding connected in parallel, centrifugally operated switch means responsive to motor speed to disconnect said starting winding at a predetermined speed, a diaphragm assembly responsive to pressure of the liquid to be pumped adapted to close the connections to the windings at a predetermined pressure, a shunt circuit arranged in parallel with said pressure responsive means, said switch means being arranged to connect said running winding through said shunt circuit at said predetermined speed thereby to cause operation of said motor independently of said pressure responsive means, and a thermal protector comprising a bimetallic element in series with said windings, a heater element in series with said bimetallic element and in physical proximity thereto, said bimetallic element being adapted to be positioned to be cooled by the liquid to be pumped until the liquid reaches a predetermined level whereby said bimetallic element will subsequently open to disconnect said running winding.

7. In a pump-motor assembly, an electric motor having at least one winding adapted to be energized through means responsive to the pressure of the liquid to be pumped, a shunt circuit adapted to be arranged in parallel with the pressure responsive means, means arranged to connect said winding through said shunt circuit after said motor starts whereby said motor is adapted to operate independently of the pressure responsive means, and heat sensitive means in series with said winding and adapted to be positioned to be cooled by the liquid to be pumped until the liquid reaches a predetermined level, said heat sensitive means being operative to disconnect said winding at a predetermined temperature.

8. In a pump-motor assembly, a single phase alternating current motor having a running winding and a starting winding connected in parallel, switch means arranged to disconnect said starting winding at a predetermined speed, said windings being adapted to be energized through means responsive to the pressure of the liquid to be pumped, a shunt circuit adapted to be arranged in parallel with the pressure responsive means, said switch means being arranged to connect said running winding through said shunt circuit at said predetermined speed whereby said motor is adapted to operate independently of the pressure responsive means, and heat sensitive means in series with said windings and adapted to be positioned to be cooled by the liquid to be pumped, said heat sensitive means being operative to disconnect said running windings at a predetermined temperature.

9. In a pump-motor assembly, a single phase alternating current motor having a running winding and a starting winding connected in parallel, switch means responsive to motor speed to disconnect said starting winding at a predetermined speed, said windings being adapted to be energized through means responsive to the pressure of the liquid to be pumped, a shunt circuit adapted to be arranged in parallel with pressure responsive means, said switch means being arranged to connect said running winding through said shunt circuit at said predetermined speed whereby said motor is adapted to operate independently of the pressure responsive means, a thermal protector comprising a bimetallic element arranged in heat protective relationship with said windings, and contact means in series with said windings controlled by said bimetallic element, said element being adapted to be positioned to be cooled by the liquid to be pumped until the liquid reaches a predetermined level whereby said element subsequently heats up to operate said contact means in series with said running winding.

No references cited.